United States Patent
Ayabe et al.

(10) Patent No.: US 12,122,898 B2
(45) Date of Patent: Oct. 22, 2024

(54) POLYOLEFIN RESIN COMPOSITION AND MOLDED ARTICLE USING SAME

(71) Applicant: ADEKA CORPORATION, Tokyo (JP)

(72) Inventors: Takashi Ayabe, Saitama (JP); Yuji Mitsuhashi, Saitama (JP); Akitomo Sato, Saitama (JP)

(73) Assignee: ADEKA CORPORATION, Tokyo (JP)

(*) Notice: Subject to any disclaimer, the term of this patent is extended or adjusted under 35 U.S.C. 154(b) by 0 days.

(21) Appl. No.: 16/341,316

(22) PCT Filed: Oct. 4, 2017

(86) PCT No.: PCT/JP2017/036113
§ 371 (c)(1),
(2) Date: Apr. 11, 2019

(87) PCT Pub. No.: WO2018/070319
PCT Pub. Date: Apr. 19, 2018

(65) Prior Publication Data
US 2020/0048430 A1 Feb. 13, 2020

(30) Foreign Application Priority Data

Oct. 12, 2016 (JP) ................. 2016-201112

(51) Int. Cl.
*C08K 5/3435* (2006.01)
*C08K 5/13* (2006.01)
*C08K 5/134* (2006.01)
*C08K 5/3475* (2006.01)

(52) U.S. Cl.
CPC .............. *C08K 5/3435* (2013.01); *C08K 5/13* (2013.01); *C08K 5/1345* (2013.01); *C08K 5/3475* (2013.01)

(58) Field of Classification Search
CPC ...... C08K 5/3435; C08K 5/13; C08K 5/1345; C08K 5/3475
See application file for complete search history.

(56) References Cited

U.S. PATENT DOCUMENTS

| | | | | |
|---|---|---|---|---|
| 3,037,954 A * | 6/1962 | Gessler | .................... | C08L 21/00 524/66 |
| 4,957,953 A | 9/1990 | Kikkawa et al. | | |
| 2006/0293454 A1 * | 12/2006 | Nadella | .................... | C08L 23/16 525/191 |
| 2009/0088513 A1 | 4/2009 | Yukino et al. | | |
| 2010/0022689 A1 | 1/2010 | Yukino et al. | | |
| 2010/0298473 A1 | 11/2010 | Yokota et al. | | |
| 2014/0378586 A1 | 12/2014 | Ayabe et al. | | |
| 2015/0158996 A1 * | 6/2015 | Ayabe | .................... | C08L 23/12 524/99 |
| 2015/0353710 A1 | 12/2015 | Ayabe et al. | | |
| 2016/0053086 A1 | 2/2016 | Ayabe et al. | | |
| 2016/0244592 A1 * | 8/2016 | Kawamoto | .......... | C08K 5/3435 |
| 2020/0048430 A1 | 2/2020 | Ayabe et al. | | |

FOREIGN PATENT DOCUMENTS

| | | |
|---|---|---|
| EP | 2873686 A1 | 5/2015 |
| JP | 1-153749 A | 6/1989 |
| JP | 10-195258 A | 7/1998 |
| JP | 2000-159940 A | 6/2000 |
| JP | 2001-302852 A | 10/2001 |
| JP | 2005-054105 A | 3/2005 |
| JP | 2006-342257 A | 12/2006 |
| JP | 2008-13691 A | 1/2008 |
| JP | 2008-137358 A | 6/2008 |
| JP | 2009-144108 A | 7/2009 |
| JP | 2009-275213 A | 11/2009 |
| JP | 4462867 B2 | 5/2010 |
| JP | 4530327 B2 | 8/2010 |
| JP | 2011-236369 A | 11/2011 |
| JP | 2013-018962 A | 1/2013 |
| JP | 2014-141616 A | 8/2014 |
| JP | 2014-198768 A | 10/2014 |
| JP | 2014-208740 A | 11/2014 |
| JP | 2018-62565 A | 4/2018 |
| WO | WO2007/000876 A1 | 1/2007 |
| WO | WO 2013/114652 A1 | 8/2013 |

OTHER PUBLICATIONS

Kumar et al. LDPE-based thermoplastic elastomers containing ground tire rubber with and without dynamic curing. Polymer Degradation and Stability 76 (2002) 137-144. (Year: 2002).*
International Search Report (PCT/ISA/210) issued in PCT/JP2017/036113, mailed on Dec. 5, 2017.
Written Opinion (PCT/ISA/237) issued in PCT/JP2017/036113, mailed on Dec. 5, 2017.

(Continued)

*Primary Examiner* — John E Uselding
(74) *Attorney, Agent, or Firm* — Birch, Stewart, Kolasch & Birch, LLP

(57) ABSTRACT

Provided are: a polyolefin resin composition that is unlikely to be affected by an NOx gas; and a molded article using the same. The polyolefin resin composition includes, with respect to 100 parts by mass of a polyolefin resin (A): 0.001 to 5 parts by mass of a hindered amine compound (B) which has a nitrogen content of less than 4.0% by mass and a molecular weight of 500 or less; and 0.001 to 5 parts by mass of a phenolic antioxidant (C). The hindered amine compound (B) which has a nitrogen content of less than 4.0% by mass and a molecular weight of 500 or less preferably contains a compound represented by the following Formula (1), where $R^1$ represents a hydrogen atom or a methyl group; and $R^2$ represents a linear or branched alkyl group having 1 to 22 carbon atoms:

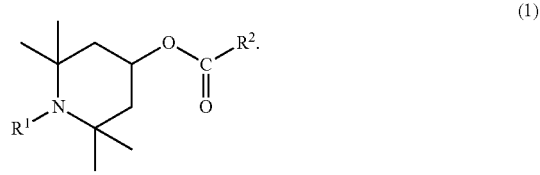

(1)

6 Claims, No Drawings

(56) References Cited

OTHER PUBLICATIONS

Extended European Search Report for European Application No. 17859805.8, dated May 20, 2020.
Office Action issued Jan. 19, 2021, in Japanese Patent Application No. 2016-201112.
Mingshan et al., Modern Engineering Plastic Modification, China Light Industry Press, pp. 113-115, Jul. 2009.
Office Action issued Nov. 29, 2021, in Chinese Patent Application No. 201780056347.X.

* cited by examiner

POLYOLEFIN RESIN COMPOSITION AND MOLDED ARTICLE USING SAME

TECHNICAL FIELD

The present invention relates to a polyolefin resin composition (hereinafter, also simply referred to as "resin composition") and a molded article using the same. More particularly, the present invention relates to: a polyolefin resin composition which is unlikely to be affected by a NOx gas; and a molded article using the same.

BACKGROUND ART

In polyolefin resins, it is known that an auto-oxidation reaction proceeds from alkyl radicals generated by the effects of light, heat and the like and deterioration is thereby accelerated; therefore, stabilization is performed by incorporating resin additives such as an antioxidant and a light stabilizer. As antioxidants to be added to polyolefin resins, for example, phenol compounds, phosphorus compounds, sulfur compounds and hydroxyamine compounds are known.

Antioxidants have a high effect of stabilizing polyolefin resins against heat and, particularly, phenol compounds are widely used since many of them are relatively inexpensive. As light stabilizers, hindered amine compounds and ultraviolet absorbers are known. Particularly, hindered amine compounds are additives having a high effect of stabilizing polyolefin resins against harmful effects of light and oxygen, and it is known that superior weather resistance is attained by using a hindered amine compound and a benzoate compound in combination. For instance, Patent Documents 1 to 8 indicate that such a combination imparts excellent weather resistance to automobile materials, fiber materials, agricultural films and the like.

RELATED ART DOCUMENTS

Patent Documents

[Patent Document 1] JP4462867B2
[Patent Document 2] JP4530327B2
[Patent Document 3] JP2006-342257A
[Patent Document 4] JP2009-144108A
[Patent Document 5] JPH10-195258A
[Patent Document 6] JP2001-302852A
[Patent Document 7] JP2000-159940A
[Patent Document 8] JP2011-236369A

SUMMARY OF THE INVENTION

Problems to be Solved by the Invention

However, it has been pointed out that polyolefin resin compositions containing a phenol compound as an antioxidant have a problem of showing prominent discoloration caused by a NOx gas. Under such circumstances, Patent Document 8 discloses that discoloration caused by a NOx gas can be suppressed by incorporating bis(1-undecaneoxy-2,2,6,6-tetramethylpiperidine-4-yl)carbonate as a hindered amine-based light stabilizer; however, the effect thereof is still not sufficient, and a further improvement is thus demanded.

In view of the above, an object of the present invention is to solve the above-described problems and provide: a polyolefin resin composition which is unlikely to be affected by a NOx gas; and a molded article using the same.

Means for Solving the Problems

The present inventors intensively studied to solve the above-described problems and consequently discovered that the problems can be solved by using a specific hindered amine compound, thereby completing the present invention.

That is, a polyolefin resin composition of the present invention is characterized by containing, with respect to 100 parts by mass of a polyolefin resin (A): 0.001 to 5 parts by mass of a hindered amine compound (B) which has a nitrogen content of less than 4.0% by mass and a molecular weight of 500 or less; and 0.001 to 5 parts by mass of a phenolic antioxidant (C). The term "molecular weight" used herein refers to a sum of the atomic weights of atoms contained in a molecule, or an average value of the total atomic weight of a mixture.

In the polyolefin resin composition of the present invention, it is preferred that the hindered amine compound (B) which has a nitrogen content of less than 4.0% by mass and a molecular weight of 500 or less contains a compound represented by the following Formula (1):

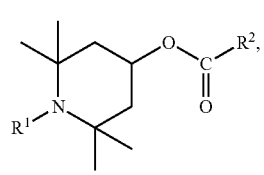

where $R^1$ represents a hydrogen atom or a methyl group; and $R^2$ represents a linear or branched alkyl group having 1 to 22 carbon atoms.

In the resin composition of the present invention, it is also preferred that the polyolefin resin (A) contains an elastomer. Further, it is preferred that the resin composition of the present invention further contains 0.001 to 5 parts by mass of a benzoate compound (D) represented by the following Formula (2):

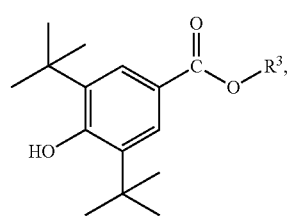

where $R^3$ represents a linear or branched alkyl group having 8 to 20 carbon atoms, or a group represented by the following Formula (3):

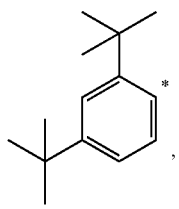

(3)

where * represents a position of a benzene ring that is linked with an oxygen atom bound with $R^3$ in Formula (2).

Still further, it is preferred that the resin composition of the present invention further contains 0.001 to 5 parts by mass of an ultraviolet absorber (E). Yet still further, in the resin composition of the present invention, it is preferred that the (E) ultraviolet absorber be a benzotriazole-based ultraviolet absorber.

A molded article of the present invention is characterized by including the polyolefin resin composition of the present invention.

Effects of the Invention

According to the present invention, a polyolefin resin composition which is unlikely to be affected by a NOx gas, and a molded article using the same can be provided.

MODE FOR CARRYING OUT THE INVENTION

The polyolefin resin composition of the present invention will now be described in detail.

The polyolefin resin composition of the present invention contains, with respect to 100 parts by mass of a polyolefin resin (A) (hereinafter, also referred to as "component (A)"): 0.001 to 5 parts by mass of a hindered amine compound (B) which has a nitrogen content of less than 4.0% by mass and a molecular weight of 500 or less (hereinafter, also referred to as "component (B)"); and 0.001 to 5 parts by mass of a phenolic antioxidant (C) (hereinafter, also referred to as "component (C)"). In this manner, by using the component (B) as a hindered amine compound, a polyolefin resin composition which is unlikely to be affected by a NOx gas can be obtained. In the resin composition of the present invention, a benzoate compound represented by the above-described Formula (2) (hereinafter, also referred to as "component (D)") and an ultraviolet absorber (E) (hereinafter, also referred to as "component (E)") may also be incorporated.

<Component (A)>

Examples of the component (A) according to the resin composition of the present invention include α-olefin polymers, such as low-density polyethylenes (LDPE), linear low-density polyethylenes (L-LDPE), high-density polyethylenes (HDPE), isotactic polypropylenes, syndiotactic polypropylenes, hemi-isotactic polypropylenes, cycloolefin polymers, stereo block polypropylenes, poly-3-methyl-1-butenes, poly-3-methyl-1-pentenes, and poly-4-methyl-1-pentenes; and α-olefin copolymers, such as ethylene-propylene block or random copolymers, impact copolymer polypropylenes, ethylene-methyl methacrylate copolymers, ethylene-methyl acrylate copolymers, ethylene-ethyl acrylate copolymers, ethylene-butyl acrylate copolymers, ethylene-vinyl acetate copolymers, ethylene-1-octene copolymers, and ethylene-vinyl alcohol resins (EVOH), and the component (A) may be an elastomer as well. In the resin composition of the present invention, two or more of the above-described resins may be blended, may form a block copolymer to be used as a block polymer-type resin, or may be alloyed. Further, the component (A) may be a chlorination product of any of these polyolefin-based resins.

Examples of the above-described elastomer include elastomers obtained by blending a polyolefin (e.g., polypropylene or polyethylene) as a hard segment and a rubber (e.g., ethylene-propylene rubber) as a soft segment, and elastomers obtained by dynamic cross-linking using them. The hard segment is, for example, at least one selected from polypropylene homopolymers, polypropylene block copolymers, polypropylene random copolymers and the like. Examples of the soft segment include ethylene-propylene copolymers (EPM), ethylene-propylene-diene copolymers (EPDM), ethylene-vinyl acetate copolymers (EVA), and vinyl acetate homopolymers. Two or more of these polymers may be used as a blend. In the resin composition of the present invention, the component (A) preferably contains an elastomer since this makes the effects of the present invention prominent As for a method of producing the above-described polyolefin resin (A), in a variety of polymerization methods such as vapor-phase polymerization, solution polymerization, emulsion polymerization and bulk polymerization that include the use of various polymerization catalysts (e.g., Ziegler catalysts, Ziegler-Natta catalysts, and metallocene catalysts), co-catalysts, catalyst carriers and chain transfer agents, the polyolefin resin can be produced by appropriately selecting polymerization conditions (e.g., temperature, pressure, concentration, flow rate, and removal of catalyst residue) that yield a resin having physical properties suitable for a packaging material or a resin having physical properties suitable for molding of a packaging material. The properties of the polyolefin resin, such as number-average molecular weight, weight-average molecular weight, molecular weight distribution, melt flow rate, melting point, melting peak temperature, stereoregularity (e.g., isotacticity or syndiotacticity), presence/absence and degree of branching, specific gravity, ratio of a component(s) dissolving in various solvents, haze, gloss, impact strength, bending modulus of elasticity and Olsen rigidity, as well as whether or not the respective physical property values satisfy a specific formula, can be selected as appropriate in accordance with the desired properties.

<Component (B)>

The component (B) according to the resin composition of the present invention has a nitrogen content of less than 4.0% by mass. The "nitrogen content" of the component (B) means the mass ratio of nitrogen with respect to the molecular weight of the hindered amine compound. In the resin composition of the present invention, the nitrogen content of the component (B) is less than 4.0% by mass, preferably in a range of 1.0% by mass to less than 4.0% by mass, more preferably in a range of 1.5 to 3.5% by mass. The reason for this is because the effects of the present invention may not be attained when the nitrogen content is 4.0% by mass or higher.

Further, the component (B) according to the resin composition of the present invention has a molecular weight of 500 or less, preferably in a range of 200 to 500, more preferably in a range of 290 to 490. The reason for this is because, when the molecular weight is 500 or higher, the dispersibility of the component (B) in the resin composition is poor, so that the stabilization effect may be deteriorated.

The component (B) according to the resin composition of the present invention is preferably a compound represented by the following Formula (1):

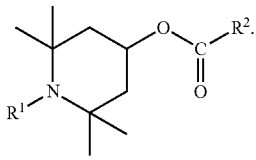
(1)

In Formula (1), $R^1$ represents a hydrogen atom or a methyl group. Further, $R^2$ represents an alkyl group having 1 to 22 carbon atoms, examples of which include methyl, ethyl, propyl, isopropyl, butyl, sec-butyl, tert-butyl, isobutyl, amyl, isoamyl, tert-amyl, hexyl, 2-hexyl, 3-hexyl, heptyl, 2-heptyl, 3-heptyl, isoheptyl, tert-heptyl, n-octyl, isooctyl, tert-octyl, 2-ethylhexyl, nonyl, isononyl, decyl, undecyl, dodecyl, tridecyl, tetradecyl, pentadecyl, hexadecyl, heptadecyl and octadecyl, and $R^2$ is more preferably an alkyl group having 12 to 22 carbon atoms since such a compound can impart excellent weather resistance.

Specific examples of a hindered amine compound represented by Formula (1) include the following compounds. In the resin composition of the present invention, however, the component (B) is not restricted to the following compounds:

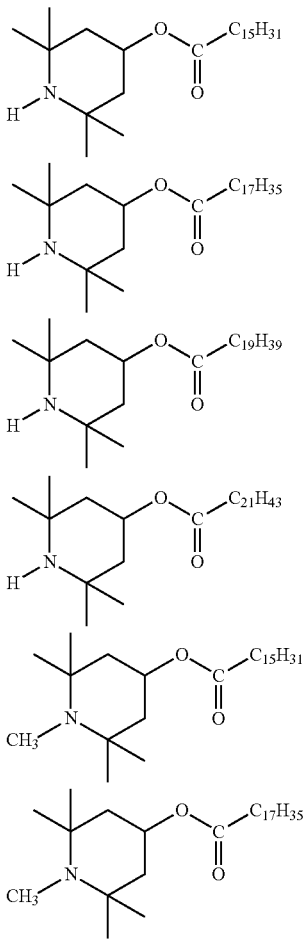

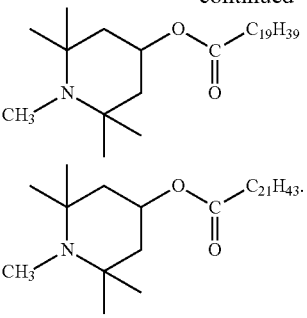

In the resin composition of the present invention, the component (B) is incorporated in an amount of 0.001 to 5 parts by mass, preferably 0.01 to 2 parts by mass, with respect to 100 parts by mass of the component (A). When the amount of the component (B) is less than 0.001 parts by mass, a required stabilization effect may not be obtained, whereas when the amount of the component (B) is greater than 5 parts by mass, the component (B) may bleed out on the surface of a molded article obtained by molding the polyolefin resin composition and thereby deteriorate the outer appearance.

<Component (C)>

Examples of the component (C) according to the resin composition of the present invention include 2,6-di-tert-butyl-4-methylphenol, 2,6-di-tert-butyl-4-ethylphenol, 2-tert-butyl-4,6-dimethylphenol, styrenated phenol, 2,2'-methylene-bis(4-ethyl-6-tert-butylphenol), 2,2'-thiobis-(6-tert-butyl-4-methylphenol), 2,2'-thiodiethylene-bis[3-(3,5-di-tert-butyl-4-hydroxyphenyl)propionate], 2-methyl-4,6-bis(octylsulfanylmethyl)phenol, 2,2'-isobutylidene-bis(4,6-dimethylphenol), isooctyl-3-(3,5-di-tert-butyl-4-hydroxyphenyl)propionate, N,N'-hexane-1,6-diylbis[3-(3,5-di-tert-butyl-4-hydroxyphenyl)propionamide, 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylene-bis(4,6-di-tert-butylphenol), esters of 3,5-di-tert-butyl-4-hydroxy-benzenepropanoic acid and a C13-15 alkyl, 2,5-di-tert-amylhydroquinone, hindered phenol polymer (AO.OH.98 (trade name), manufactured by ADEKA Palmarole), 2,2'-methylene-bis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 6-[3-(3-tert-butyl-4-hydroxy-5-methyl)propoxy]-2,4,8,10-tetra-tert-butylbenzo[d,f][1,3,2]-dioxaphosphepin, hexamethylene-bis[3-(3,5-di-tert-butyl-4-hydroxyphenyl) propionate, calcium bis[monoethyl(3,5-di-tert-butyl-4-hydroxybenzyl)phosphonate, a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-α-tocophenol (vitamin E), 2,6-bis(α-methylbenzyl)-4-methylphenol, bis[3,3-bis-(4'-hydroxy-3'-tert-butyl-phenyl)butanoic acid]glycol ester, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'- butylidene-bis(2,6-di-tert-butylphenol), 4,4'-butylidene-bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-t etraoxaspiro[5.5]undecane, triethylene glycol-bis[β-(3-tert-butyl-4-hydroxy-5-methylphenyl)propionate], and 3-(3,5-dialkyl-4-hydroxyphenyl)propionic acid derivatives, such as stearyl-3-(3,5-di-tert-butyl-4-hydroxyphenyl)propionic acid amide, palmityl-3-(3,5-di-tert-butyl-4-hydroxyphenyl)propionic acid amide, myristyl-3-(3,5-di-tert-butyl-4-hydroxyphenyl) propionic acid amide and lauryl-3-(3,5-di-tert-butyl-4-hydroxyphenyl)propionic acid amide. In the resin composition of the present invention, tetrakis[methylene-3-(3',5'-tert-butyl-4'-hydroxyphenyl)propionate]methane is preferred since it is inexpensive and has an excellent effect of stabilizing polyolefin resins.

In the resin composition of the present invention, the component (C) is incorporated in an amount of 0.001 to 5 parts by mass, preferably 0.01 to 1.0 parts by mass, with respect to 100 parts by mass of the component (A). By controlling the amount of the component (C) in this range, the effect as an antioxidant can be favorably obtained.

<Component (D)>

It is preferred that the resin composition of the present invention further contains a benzoate compound represented by the following Formula (2) as a component (D):

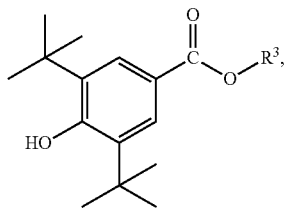

(2)

where $R^3$ represents a linear or branched alkyl group having 8 to 20 carbon atoms or a group represented by the following Formula (3):

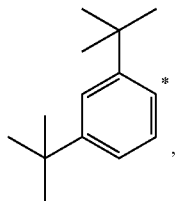

(3)

where * represents a position of a benzene ring that is linked with an oxygen atom bound with $R^3$ in Formula (2).

In the benzoate compound represented by Formula (2), examples of the alkyl group having 8 to 20 carbon atoms represented by $R^3$ include decyl, undecyl, dodecyl, tridecyl, tetradecyl, pentadecyl, hexadecyl, heptadecyl, octadecyl, and behenyl.

Specific examples of the benzoate compound represented by Formula (2) include the following compounds. However, the resin composition of the present invention is not restricted by the following compounds by any means:

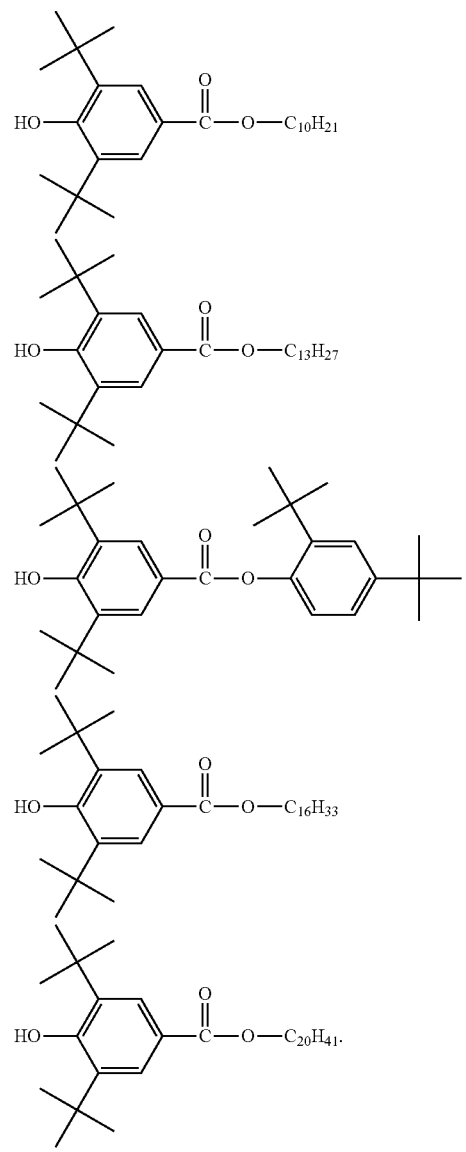

In the resin composition of the present invention, the ratio of the component (B) and the component (D) (component (B):component (D)) is preferably in a range of 1:4 to 4:1, more preferably in a range of 3:1 to 1:2. When the component (D) is incorporated into the resin composition of the present invention, the amount thereof is preferably 0.001 to 5 parts by mass with respect to 100 parts by mass of the component (A).

<Component (E)>

It is preferred that the resin composition of the present invention further contains an ultraviolet absorber as a component (E). Examples of the component (E) include 2-hydroxybenzophenones, such as 2,4-dihydroxybenzophenone and 5,5'-methylene-bis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, and 2-[2-hydroxy-4-(3-methacryloyloxypropyl)phenyl]benzotriazole; benzoates, such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate, and behenyl(3,5-di-tert-butyl-4-hydroxy)benzoate; substituted oxanilides, such as 2-ethyl-2'-ethoxyoxanilide and 2-ethoxy-4'-dodecyloxanilide; cyanoacrylates, such as ethyl-α-cyano-β,β-diphenyl acrylate and methyl-2-cyano-3-methyl-3-(p-methoxyphenyl)acrylate; and a variety of metal salts and metal chelates, particularly salts and chelates of nickel and chromium. Thereamong, benzotriazole-based ultraviolet absorbers are particularly preferred.

When the component (E) is incorporated into the resin composition of the present invention, the amount thereof is preferably 0.001 to 5 parts by mass, more preferably 0.01 to 0.5 parts by mass, with respect to 100 parts by mass of the component (A).

<Other Components>

In the resin composition of the present invention, in addition to the above-described indispensable components (A), (B) and (C) and components (D) and (E), an optional and known resin additive(s), such as a phosphorus-based antioxidant, a thioether-based antioxidant, other antioxidant, a hindered amine compound other than the compound represented by Formula (1), a nucleating agent, a flame retardant, a flame retardant aid, a lubricant, a filler, a hydrotalcite, an antistatic agent, a pigment and a dye, may also be incorporated within such a range that does not markedly impair the effects of the present invention.

Examples of the phosphorus-based antioxidant include triphenyl phosphite, diisooctyl phosphite, heptakis(dipropylene glycol)triphosphite, triisodecyl phosphite, diphenylisooctyl phosphite, diisooctylphenyl phosphite, diphenyltridecyl phosphite, triisooctyl phosphite, trilauryl phosphite, diphenyl phosphite, tris(dipropylene glycol)phosphite, diisodecylpentaerythritol diphosphite, dioleyl hydrogen phosphite, trilauryl trithiophosphite, bis(tridecyl)phosphite, tris(isodecyl)phosphite, tris(tridecyl)phosphite, diphenyldecyl phosphite, dinonylphenyl-bis(nonylphenyl)phosphite, poly (dipropylene glycol)phenyl phosphite, tetraphenyl dipropylene glycol diphosphite, trisnonylphenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tri (decyl) phosphite, octyldiphenyl phosphite, di(decyl)monophenyl phosphite, distearyl pentaerythritol diphosphite, a mixture of distearyl pentaerythritol and calcium stearate, alkyl(C10) bisphenol-A phosphite, di(tridecyl)pentaerythritol diphosphite, di(nonylphenyl)pentaerythritol diphosphite, bis(2,4-di-tert-butylphenyl)pentaerythritol diphosphite, bis (2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetraphenyl-tetra(tridecyl)pentaerythritol tetraphosphite, bis (2,4-di-tert-butyl-6-methylphenyl)ethyl phosphite, tetra(tridecyl)isopropylidene diphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, (1-methyl-1-propenyl-3-ylidene)-tris(1,1-dimethylethyl)-5-methyl-4,1-phenylene) hexatridecyl phosphite, 2,2'-methylene-bis(4,6-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, 4,4'-butylidene-bis(3-methyl-6-tert-butylphenylditridecyl)phosphite, tris (2-[(2,4,8,10-tetrakis-tert-butyldibenzo[d,f][1,3,2]dioxaphosphepin-6-yl)oxy]ethyl)amine, 3,9-bis(4-nonylphenoxy)-2, 4,8,10-tetraoxa-3,9-diphosphaspiro[5.5]undecane, 2,4,6-tri-tert-butylphenyl-2-butyl-2-ethyl-1,3-propanediol phosphite, and poly-4,4'-isopropylidene diphenol C12-15 alcohol phosphite.

When a phosphorus-based antioxidant is incorporated, the amount thereof is preferably 0.001 to 20 parts by mass, more preferably 0.01 to 5 parts by mass, with respect to 100 parts by mass of the component (A).

Examples of the thioether-based antioxidant include 3,3'-thiodipropionic acid, alkyl (C12-14) thiopropionate, di(lauryl)-3,3'-thiodipropionate, di(tridecyl)-3,3'-thiodipropionate, di(myristyl)-3,3'-thiodipropionate, di(stearyl)-3,3'-thiodipropionate, di(octadecyl)-3,3'-thiodipropionate, laurylstearyl thiodipropionate, tetrakis[methylene-3-(dodecylthio)propionate]methane, thiobis(2-tert-butyl-5-methyl-4,1-phenylene)bis(3-(dodecylthio)propionate), 2,2'-thiodiethylene-bis(3-aminobutanoate), 4,6-bis(octylthiomethyl)-o-cresol, 2,2'-thiodiethylene-bis[3-(3,5-di-tert-butyl-4-hydroxyphenyl)propionate], 2,2'-thiobis(4-methyl-6-tert-butylphenol), 2,2'-thiobis(6-tert-butyl-p-cresol), 2-ethylhexyl-(3,5-di-tert-butyl-4-hydroxybenzyl)thioacetate, 4,4'-thiobis(6-tert-butyl-3-methylphenol), 4,4'-thiobis(4-methyl-6-tert-butylphenol), 4,4'-[thiobis(methylene)]bis(2-tert-butyl-6-methyl-1-hydroxybenzyl), bis(4,6-di-tert-butylphenol-2-yl) sulfide, tridecyl-3,5-di-tert-butyl-4-hydroxybenzyl thioacetate, 1,4-bis(octylthiomethyl)-6-methylphenol, 2,4-bis (dodecylthiomethyl)-6-methylphenol, distearyl disulfide, and bis(methyl-4-[3-n-alkyl(C12/C14)thiopropionyloxy]5-tert-butylphenyl)sulfide.

When a thioether-based antioxidant is incorporated, the amount thereof is preferably 0.001 to 20 parts by mass, more preferably 0.01 to 5 parts by mass, with respect to 100 parts by mass of the component (A).

Examples of the above-described other antioxidant include nitrone compounds, such as N-benzyl-α-phenyl nitrone, N-ethyl-α-methyl nitrone, N-octyl-α-heptyl nitrone, N-lauryl-α-undecyl nitrone, N-tetradecyl-α-tridecyl nitrone, N-hexadecyl-α-pentadecyl nitrone, N-octyl-α-heptadecyl nitrone, N-hexadecyl-α-heptadecyl nitrone, N-octadecyl-α-pentadecyl nitrone, N-heptadecyl-α-heptadecyl nitrone, and N-octadecyl-α-heptadecyl nitrone; and benzofuran compounds, such as 3-arylbenzofuran-2(3H)-one, 3-(alkoxyphenyl)benzofuran-2-one, 3-(acyloxyphenyl)benzofuran-2(3H)-one, 5,7-di-tert-butyl-3-(3,4-dimethylphenyl)-benzofuran-2(3H)-one, 5,7-di-tert-butyl-3-(4-hydroxyphenyl)-benzofuran-2(3H)-one, 5,7-di-tert-butyl-3-{4-(2-hydroxyethoxy)phenyl}-benzofuran-2(3H)-one, 6-(2-(4-(5,7-di-tert-2-oxo-2,3-dihydrobenzofuran-3-yl)phenoxy)ethoxy)-6-oxohexyl-6-((6-hydroxyhexanoyl)oxy)hexanoate, and 5-di-tert-butyl-3-(4-((15-hydroxy-3,6,9,13-tetraoxapentadecyl)oxy)phenyl)benzofuran-2(3H)-one.

When other antioxidant is incorporated, the amount thereof is preferably 0.001 to 20 parts by mass, more preferably 0.01 to 5 parts by mass, with respect to 100 parts by mass of the component (A).

Examples of the above-described hindered amine compound other than the compound represented by Formula (1) include bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)di(tridecyl)-1,2,3,4-butanetetracarboxylate, bis(1,2,2,6,6-pentamethyl-4-piperidyl) di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazine-6-yl]-1, 5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl]aminoundecane, 1,6,11-tris[2,4-bis(N-butyl-N-(1,2,2,6,6-pentamethyl-4-piperidyl)amino-s-triazine-6-yl]amino undecane, bis {4-(1-octyloxy-2,2,6,6-tetramethyl)piperidyl}decanedionate, bis {4-(2,2,6,6-tetramethyl-1-undecyloxy)piperidyl)carbonate, and TINUVIN NOR 371 manufactured by Ciba Specialty Chemicals K.K.

When a hindered amine compound other than the compound represented by Formula (1) is incorporated, the total amount thereof with the compound represented by Formula (1) is preferably 0.001 to 5 parts by mass, more preferably 0.005 to 0.5 parts by mass, with respect to 100 parts by mass of the component (A).

Examples of the above-described flame retardant include aromatic phosphates, such as triphenyl phosphate, tricresyl phosphate, trixylenyl phosphate, cresyldiphenyl phosphate, cresyl-2,6-dixylenyl phosphate, resorcinol-bis(diphenylphosphate), (1-methylethylidene)-4,1-phenylene tetraphenyldiphosphate, 1,3-phenylene-tetrakis(2,6-dimethylphenyl)phosphate, ADK STAB (Registered Trademark) FP-500 (manufactured by ADEKA Corporation), ADK STAB (Registered Trademark) FP-600 (manufactured by ADEKA Corporation), and ADK STAB (Registered Trademark) FP-800 (manufactured by ADEKA Corporation); phosphonates, such as divinyl phenylphosphonate, diallyl phenylphosphonate, and (1-butenyl) phenylphosphonate; phosphinates, such as phenyl diphenylphosphinate, methyl diphenylphosphinate, and 9,10-dihydro-9-oxa-10-phosphaphenanthlene-10-oxide derivatives; phosphazene compounds, such as bis(2-allylphenoxy)phosphazene and dicresylphosphazene; phosphorus-based flame retardants, such as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds, and red phosphorus; metal hydroxides, such as magnesium hydroxide and aluminum hydroxide; and bromine-based flame retardants, such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate, and brominated styrene. These flame retardants are preferably used in combination with a drip inhibitor such as a fluorocarbon resin, and/or a flame retardant aid such as a polyhydric alcohol or a hydrotalcite.

When a flame retardant is incorporated, the amount thereof is preferably 1 to 50 parts by mass, more preferably 10 to 30 parts by mass, with respect to 100 parts by mass of the component (A).

The above-described lubricant is added for the purposes of imparting the surface of the resulting molded article with lubricity and improving the damage-preventing effect. Examples of the lubricant include hydrocarbon-based lubricants, such as low-molecular-weight waxes, paraffin waxes, chlorinated hydrocarbons, and fluorocarbons; natural wax-based lubricants, such as carnauba wax and candelilla wax; fatty acid-based lubricants, such as higher fatty acids (e.g., lauric acid, stearic acid, and behenic acid) and oxy fatty acids (e.g., hydroxystearic acid); aliphatic amide-based lubricants, such as aliphatic amide compounds (e.g., stearylamide, laurylamide, and oleylamide) and alkylene bis-aliphatic amide compounds (e.g., methylene bis-stearylamide and ethylene bis-stearylamide); fatty acid alcohol ester-based lubricants, such as fatty acid monohydric alcohol ester compounds (e.g., stearyl stearate, butyl stearate, and distearyl phthalate), fatty acid polyhydric alcohol ester compounds (e.g., glycerin tristearate, sorbitan tristearate, pentaerythritol tetrastearate, dipentaerythritol hexastearate, polyglycerin polyricinoleate, and hardened castor oil), and complex ester compounds composed of a monovalent fatty acid, a polybasic organic acid and a polyhydric alcohol (e.g., adipic acid-stearic acid ester of dipentaerythritol); aliphatic alcohol-based lubricants, such as stearyl alcohol, lauryl alcohol, and palmityl alcohol; metallic soaps; montanoic acid-based lubricants, such as partially-saponified montanoic acid esters; acrylic lubricants; and silicone oils. These lubricants may be used individually, or two or more thereof may be used in combination.

When a lubricant is incorporated, the amount thereof is preferably 0.01 to 2 parts by mass, more preferably 0.03 to 0.5 parts by mass, with respect to 100 parts by mass of the component (A).

Examples of the above-described filler include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fibers, clays, dolomite, mica, silica, alumina, potassium titanate whiskers, wollastonite, and fibrous magnesium oxysulfate, and any of these fillers can used by appropriately selecting the particle size (the fiber diameter, fiber length and aspect ratio in the case of a fibrous filler). Further, the filler to be used may be subjected to a surface treatment as required.

When a filler is incorporated, the amount thereof is preferably 0.01 to 80 parts by mass, more preferably 1 to 50 parts by mass, with respect to 100 parts by mass of the component (A).

As the above-described metallic soap, salts formed by a metal, such as magnesium, calcium, aluminum or zinc, and a saturated or unsaturated fatty acid, such as lauric acid, myristic acid, palmitic acid, stearic acid, behenic acid or oleic acid, can be used.

When a metallic soap is incorporated, the amount thereof is preferably 0.001 to 10 parts by mass, more preferably 0.01 to 5 parts by mass, with respect to 100 parts by mass of the component (A).

The above-described hydrotalcite is a complex salt compound which is known as a natural or synthetic product and composed of magnesium, aluminum, hydroxyl groups, a carbonate group and arbitrary crystal water, and examples thereof include hydrotalcites in which some of the magnesium or aluminum atoms are substituted with other metal such as an alkali metal or zinc; and hydrotalcites in which the hydroxyl group(s) and/or carbonate group is/are substituted with other anionic group(s), specifically hydrotalcites represented by the following Formula (4) in which a metal is substituted with an alkali metal:

$$Mg_{X1}Zn_{X2}Al_2(OH)_{2(X1+X2)}(CO_3)pH_2O \qquad (4)$$

where X1 and X2 each represent a number that satisfies the conditions represented by the following equations; and p represents 0 or a positive number:

$$0 \le X2/X1 < 10,\ 2 \le (X1+X2) \le 20).$$

In addition, as an Al—Li hydrotalcite, a compound represented by the following Formula (5) can be used as well:

$$[Li_{1/3}Al_{2/3}(OH)_2]\cdot[A^{q-}{}_{1/3q}\cdot pH_2O] \qquad (5)$$

where $A^{q-}$ represents an anion having a valence of q; and p represents 0 or a positive number.

Further, the carbonate anions in the above-described hydrotalcites may be partially substituted with other anions.

In these hydrotalcites, the crystal water may be dehydrated, and the hydrotalcites may be coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester, or a wax.

The above-described hydrotalcite may be a naturally-occurring or synthetic hydrotalcite. Examples of a synthesis method thereof include known methods that are described in JPS46-2280B, JPS50-30039B, JPS51-29129B, JPH03-36839B, JPS61-174270A, JPH05-179052A and the like. In addition, the above-exemplified hydrotalcites can be used without any restriction on the crystal structure, crystal particles and the like. When a hydrotalcite is incorporated, the amount thereof is preferably 0.001 to 5 parts by mass, more preferably 0.05 to 3 parts by mass, with respect to 100 parts by mass of the component (A).

Examples of the above-described antistatic agent include cationic antistatic agents, such as fatty acid quaternary ammonium ion salts and polyamine quaternary salts; anionic antistatic agents, such as higher alcohol phosphates, higher alcohol EO adducts, polyethylene glycol fatty acid esters, anionic alkyl sulfonates, higher alcohol sulfates, higher alcohol ethylene oxide adduct sulfates, and higher alcohol ethylene oxide adduct phosphates; nonionic antistatic agents, such as polyhydric alcohol fatty acid esters, polyglycol phosphates, and polyoxyethylene alkyl allyl ethers; and amphoteric antistatic agents, such as amphoteric alkyl betaines (e.g., alkyldimethylamino acetic acid betaines) and imidazoline-type amphoteric activators. These antistatic agents may be used individually, or two or more thereof may be used in combination.

When an antistatic agent is incorporated, the amount thereof is preferably 0.01 to 20 parts by mass, more preferably 3 to 10 parts by mass, with respect to 100 parts by mass of the component (A).

As the above-described pigment, a commercially available pigment can be used as well, and examples thereof include PIGMENT RED 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; PIGMENT ORANGE 13, 31, 34, 36, 38, 43, 46, 48, 49, 51, 52, 55, 59, 60, 61, 62, 64, 65 and 71; PIGMENT YELLOW 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; PIGMENT GREEN 7, 10, and 36; PIGMENT BLUE 15, 15:1, 15:2, 15:3, 15:4, 15:5, 15:6, 22, 24, 56, 60, 61, 62, and 64; and PIGMENT VIOLET 1, 19, 23, 27, 29, 30, 32, 37, 40, and 50.

Examples of the above-described dye include azo dyes, anthraquinone dyes, indigoid dyes, triarylmethane dyes, xanthene dyes, alizarin dyes, acridine dyes, stilbene dyes, thiazole dyes, naphthol dyes, quinoline dyes, nitro dyes, indamine dyes, oxazine dyes, phthalocyanine dyes and cyanine dyes, and a plurality of these dyes may be used in combination.

The resin composition of the present invention can be obtained by uniformly mixing and kneading the above-described components. A method thereof is not particularly restricted, and the resin composition of the present invention can be produced by, for example, dry-blending the components using a mixing equipment such as a Henschel mixer or a tumbler and subsequently kneading the resultant using an extruder, a Banbury mixer, a roll mixer, a Brabender plastograph, a kneader or the like at a processing temperature of 100° C. to 260° C. Particularly, the production is preferably carried out using a Henschel mixer as a mixing equipment and an extruder, especially a biaxial extruder, as a processing machine.

The molded article of the present invention is obtained by molding the resin composition of the present invention. The molding process of the resin composition of the present invention is not particularly restricted, and a method thereof include injection molding, extrusion molding, blow molding, vacuum molding, inflation molding, calender molding, slush molding, dip molding, and foam molding; however, it is preferred to employ an injection molding method for the molded article of the present invention.

Examples of the use of the resin composition of the present invention include automobile resin components, such as bumpers, dash boards, instrument panels, moldings, interior skins, and packings; resin parts for household electric appliances, such as refrigerators, laundry machines, and vacuum cleaners; household articles, such as tablewares, buckets, and bath goods; resin parts for connection, such as connectors; miscellaneous goods, such as toys; storage containers, such as tanks and bottles; medical items, such as medical packages, syringes, catheters, and medical tubes;

building materials, such as wall materials, flooring materials, window frames, and wall papers; wire coating materials; agricultural materials, such as greenhouses and tunnels; food packaging materials, such as wraps and trays; various molded articles, such as films and sheets; and fibers.

Examples

The present invention will now be described more concretely by way of Examples thereof; however, the present invention is not restricted thereto by any means.

First, the nitrogen content and the molecular weight of each hindered amine compound that was evaluated are shown in Table 1. It is noted here that the molecular weight (3,100 to 4,000) of CHIMASSORB 944 represents the styrene-equivalent molecular weight measured by GPC in tetrahydrofuran (THF), and that the molecular weight of XT-855 represents the molecular weight of the hindered amine compound contained as a main component.

TABLE 1

| | Nitrogen content [% by mass] | Molecular weight of hindered amine compound [Mw] |
|---|---|---|
| Compound 1[1] | 3.3 | 424 |
| LA-40[2] | 3.0 | 410 |
| LA-81[3] | 4.1 | 681 |
| LA-57[4] | 7.1 | 791 |
| CHIMASSORB 944[5] | 10.0 | 3,100 to 4,000 |
| TINUVIN 123[6] | 3.8 | 737 |
| XT-855[7] | 3.7 | 510 |

[1] Compound 1: 1,2,2,6,6-pentamethylpiperidyl stearate
[2] LA-40: a mixture of 2,2,6,6-tetramethylpiperidyl stearate and 2,2,6,6-tetramethylpiperidyl myristate
[3] LA-81: a hindered amine compound product "ADK STAB LA-81" manufactured by ADEKA Corporation
[4] LA-57: a hindered amine compound product "ADK STAB LA-57" manufactured by ADEKA Corporation
[5] CHIMASSORB 944: a hindered amine compound product "CHIMASSORB 944" manufactured by BASF Ltd.
[6] TINUVIN 123: a hindered amine compound product "TINUVIN 123" manufactured by BASF Ltd.
[7] XT-855: a hindered amine compound product "TINUVIN XT-855" manufactured by BASF Ltd.

With respect to 100 parts by mass of "TPV MILASTOMER 5030N" (trade name, manufactured by Mitsui Chemicals, Inc.) as a polyolefin resin (A), the respective hindered amine compound shown in Table 1 as a component (B), "ADK STAB AO-60" (trade name, manufactured by ADEKA Corporation) as a phenolic antioxidant (C), 0.05 parts by mass of "ADK STAB 2112" (trade name, manufactured by ADEKA Corporation) as a phosphorus-based antioxidant, "ADK STAB LA-36" (trade name, manufactured by ADEKA Corporation) as a benzotriazole-based ultraviolet absorber (E), and "hexadecyl-3,5-di-tert-butyl-4-hydroxybenzoate" as a benzoate compound were blended in the amounts shown in Tables 2 and 3, and the resultants were each roll-processed at a processing temperature of 180° C. and a roll rotation rate of 30 rpm for a roll-kneading time of 5 minutes to obtain sheets having a thickness of about 0.7 mm.

Next, the thus obtained sheets were each pressed for 5 minutes using a press machine heated to 180° C. to prepare 0.4 mm-thick sheets, which were used as test pieces. The following evaluations were performed for each of the thus obtained test pieces.

(Discoloration Test with NOx Gas)

In accordance with JIS L0855 (Test methods for colour fastness to nitrogen oxides), each test piece was exposed to a NOx gas at a concentration of 666 ppm for 24 hours using a "NOx gas exposure test instrument" manufactured by Suga Test Instruments Co., Ltd. Then, the test piece was taken out of the "NOx gas exposure test instrument", and the values of Y.I. and a* were measured using a "multiple light source spectrocolorimeter" manufactured by Suga Test Instruments Co., Ltd. The differences in Y.I. and a* between before and after the exposure to a NOx gas were calculated as $\Delta$Y.I. and $\Delta$a*, respectively. The results thereof are shown in Tables 2 and 3.

(Weather Resistance Test)

Each test piece was subjected to a weather resistance test using a "xenon weather meter" manufactured by Suga Test Instruments Co., Ltd. at a black panel temperature of 89° C. under an irradiation condition with no water spray, and the carbonyl index of the test piece was measured using a "Fourier transform infrared spectrophotometer" manufactured by Shimadzu Corporation. The carbonyl index is defined by $\log((I_o-I)/I_o)$ based on the infrared absorption spectrum analysis data of each test piece. It is noted here that $I_o$ represents the height from a baseline at about 1,710 cm$^{-1}$ to a transmittance of 100(%), and I represents the peak transmittance (%) at about 1,710 cm$^1$. A higher carbonyl index value indicates further deterioration of the test piece. This weather resistance test was performed until the carbonyl index reached 1.5. The time required for the carbonyl index to reach 1.5 is shown in Tables 2 and 3.

(Heat Resistance Test)

Each test piece was left to stand in a 120° C. thermostatic chamber using a "high-temperature incubator" manufactured by ESPEC Corp., and the Y.I. was measured using a "multiple light source spectrocolorimeter" manufactured by Suga Test Instruments Co., Ltd. In this test, each test piece was exposed in the 120° C. thermostatic chamber until the Y.I. reached 20. The time required for the Y.I. to reach 20 is shown in Tables 2 and 3.

TABLE 2

| | | Example 1 | Example 2 | Example 3 | Example 4 | Example 5 |
|---|---|---|---|---|---|---|
| Hindered amine compound | Compound 1 | 0.2 | 0.05 | — | 0.1125 | 0.075 |
| | LA-40 | — | — | 0.2 | — | — |
| | LA-81 | — | — | — | 0.0125 | 0.1 |
| | LA-57 | — | — | — | — | — |
| | CHIMASSORB 944 | — | — | — | — | — |
| | TINUVIN 123 | — | — | — | — | — |
| | XT-855 | — | — | — | — | — |
| Benzoate compound | | — | 0.15 | — | 0.075 | 0.025 |
| Phenolic antioxidant | | 0.05 | 0.05 | 0.05 | 0.05 | 0.05 |
| Ultraviolet absorber | | 0.15 | 0.15 | 0.15 | 0.15 | 0.15 |
| Phosphorus-based antioxidant | | 0.05 | 0.05 | 0.05 | 0.05 | 0.05 |
| Evaluation Gas discoloration test | $\Delta$Y.I. | 1.7 | 2.5 | 3.0 | 2.8 | 3.0 |
| | $\Delta$a* | 0.4 | 0.6 | 1.7 | 0.5 | 0.4 |

TABLE 2-continued

|  | Example 1 | Example 2 | Example 3 | Example 4 | Example 5 |
|---|---|---|---|---|---|
| Weather resistance [hours] | 1,209 | 1,234 | 1,232 | 1,295 | 1,351 |
| Heat resistance [hours] | 361 | 423 | 185 | 403 | 395 |

TABLE 3

|  |  | Comparative Example 1 | Comparative Example 2 | Comparative Example 3 | Comparative Example 4 | Comparative Example 5 | Comparative Example 6 |
|---|---|---|---|---|---|---|---|
| Hindered amine compound | Compound 1 | — | — | — | — | — | — |
|  | LA-40 | — | — | — | — | — | — |
|  | LA-81 | — | 0.2 | — | — | — | — |
|  | LA-57 | — | — | 0.2 | — | — | — |
|  | CHIMASSORB 944 | — | — | — | 0.2 | — | — |
|  | TINUVIN 123 | — | — | — | — | 0.2 | — |
|  | XT-855 | — | — | — | — | — | 0.2 |
| Benzoate compound |  | — | — | — | — | — | — |
| Phenolic antioxidant |  | 0.05 | 0.05 | 0.05 | 0.05 | 0.05 | 0.05 |
| Ultraviolet absorber |  | 0.15 | 0.15 | 0.15 | 0.15 | 0.15 | 0.15 |
| Phosphorus-based antioxidant |  | 0.05 | 0.05 | 0.05 | 0.05 | 0.05 | 0.05 |
| Evaluation | Gas discoloration test ΔY.I. | 4.3 | 3.4 | 17.2 | 18.0 | 9.0 | 6.4 |
|  | Δa* | 0.3 | 0.3 | 8.2 | 6.8 | 0.6 | 2.8 |
|  | Weather resistance [hours] | 205 | 1,251 | 911 | 927 | 1,004 | 1,258 |
|  | Heat resistance [hours] | 286 | 315 | 182 | 121 | 223 | 301 |

From Comparative Examples 2 to 4, it was confirmed that the discoloration caused by a NOx gas was increased as the nitrogen content was increased. In Comparative Example 2, LA-81, which is a hindered amine compound having a nitrogen content of slightly higher than 4.0% by mass, was confirmed to slightly improve the discoloration caused by a NOx gas; however, the improvement was not satisfactory. Moreover, according to Comparative Examples 5 and 6, even when the nitrogen content was less than 4.0% by mass, an addition of a hindered amine compound having a molecular weight of higher than 500 resulted in aggravation of the discoloration caused by a NOx gas.

On the other hand, the resin compositions according to the present invention were confirmed to be capable of better suppressing the discoloration in the gas discoloration test than the resin compositions of Comparative Examples 2 to 6. In addition, from Examples 4 and 5, it was confirmed that, by using a hindered amine compound represented by Formula (1), the discoloration with a NOx gas that is attributed to a hindered amine compound having a nitrogen content of higher than 4.0% by mass and a molecular weight of higher than 500 can be suppressed. Moreover, as a result of comparing Examples 1 and 2, it was confirmed that the weather resistance and the heat resistance were improved by using the benzoate compound in combination.

The resin composition of the present invention is capable of exhibiting excellent weather resistance even in the presence of a NOx gas; therefore, the resin composition of the present invention can be suitably used in those applications involving exposure to a NOx gas, such as automobile materials and buildings (building materials) installed with power generators and work vehicles.

The invention claimed is:

1. A polyolefin resin composition comprising, with respect to 100 parts by mass of a polyolefin resin (A):

0.05 to 0.2 parts by mass of a hindered amine compound (B) which has a nitrogen content of less than 4.0% by mass and a molecular weight of 500 or less;

0.001 to 5 parts by mass of a phenolic antioxidant (C);

0.01 to 0.5 parts by mass of an ultraviolet absorber (E); and 0.01 to 5 parts by mass of a phosphorus-based antioxidant; and wherein said polyolefin resin (A) consists of an elastomer obtained by dynamic cross-linking using a polyolefin and a rubber, wherein resin components contained in said polyolefin resin composition consist of said elastomer obtained by dynamic cross-linking, wherein said hindered amine compound (B) which has a nitrogen content of less than 4.0% by mass and a molecular weight of 500 or less comprises a compound represented by the following Formula (1):

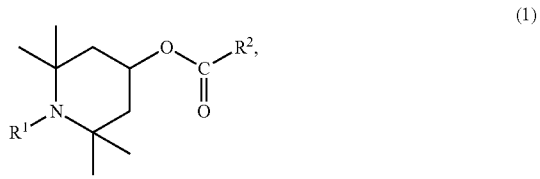

(1)

wherein $R^1$ represents a methyl group; and $R^2$ represents a linear or branched alkyl group having 1 to 22 carbon atoms, and wherein the polyolefin resin composition does not comprise a nucleating agent.

2. The polyolefin resin composition according to claim 1, further comprising 0.001 to 5 parts by mass of a benzoate compound (D) represented by the following Formula (2):

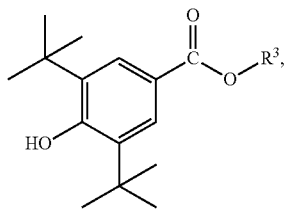

(2)

wherein $R^3$ represents a linear or branched alkyl group having 8 to 20 carbon atoms, or a group represented by the following Formula (3):

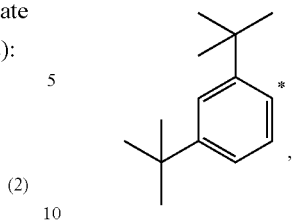

(3)

wherein * represents a position of a benzene ring that is linked with an oxygen atom bound with $R^3$ in the Formula (2).

3. The polyolefin resin composition according to claim 1, wherein the ultraviolet absorber (E) is a benzotriazole-based ultraviolet absorber.

4. A molded article comprising the polyolefin resin composition according to claim 1.

5. A molded article comprising the polyolefin resin composition according to claim 2.

6. A molded article comprising the polyolefin resin composition according to claim 3.

* * * * *